United States Patent [19]

Quere

[11] 3,875,343

[45] Apr. 1, 1975

[54] AUTOMATIC DEVICE FOR TESTING TELEPHONE EQUIPMENT

[75] Inventor: Joseph Quere, Lannion, France

[73] Assignee: Socotel Societe Mixte pour le Developpement de la Technique de la Commutation dans le Domaine des Telecommunications, Issy-les-Moulineaux, France

[22] Filed: Mar. 19, 1973

[21] Appl. No.: 342,839

[30] Foreign Application Priority Data

Mar. 21, 1972 France .............................. 72.10578

[52] U.S. Cl. .................... 179/175.3 R, 179/175.2 R

[51] Int. Cl. .......................... H04b 3/46, H04m 3/22

[58] Field of Search ...... 179/175.3 R, 175.2 R, 2 A, 179/6 R, 81 R, 84 R, 100.1 R, 18 BE, 175; 328/72

[56] References Cited

UNITED STATES PATENTS

| | | | |
|---|---|---|---|
| 3,044,065 | 7/1962 | Barney et al. | 328/72 |
| 3,515,813 | 6/1970 | Cleary | 179/18 BE |
| 3,641,270 | 2/1972 | Ohshima et al. | 179/6 R |
| 3,711,647 | 1/1973 | Ando | 179/6 R |
| 3,711,649 | 1/1973 | Ando | 179/6 R |
| 3,739,107 | 6/1973 | Spencer | 179/175.3 |
| 3,769,583 | 10/1973 | Spencer et al. | 328/72 |

*Primary Examiner*—Kathleen H. Claffy
*Assistant Examiner*—Douglas W. Olms
*Attorney, Agent, or Firm*—Alter, Weiss, Whitesel & Laff

[57] ABSTRACT

An automatic answering device for testing telephone equipment comprising a detector for detecting a telephone call, a signal generator of audio frequency signals, and a normally-released relay for connecting the detector to the telephone line. When the relay operates, the telephone line is connected to the signal generator. A counter counts while the call is incoming. Thereafter, the relay operates.

8 Claims, 1 Drawing Figure

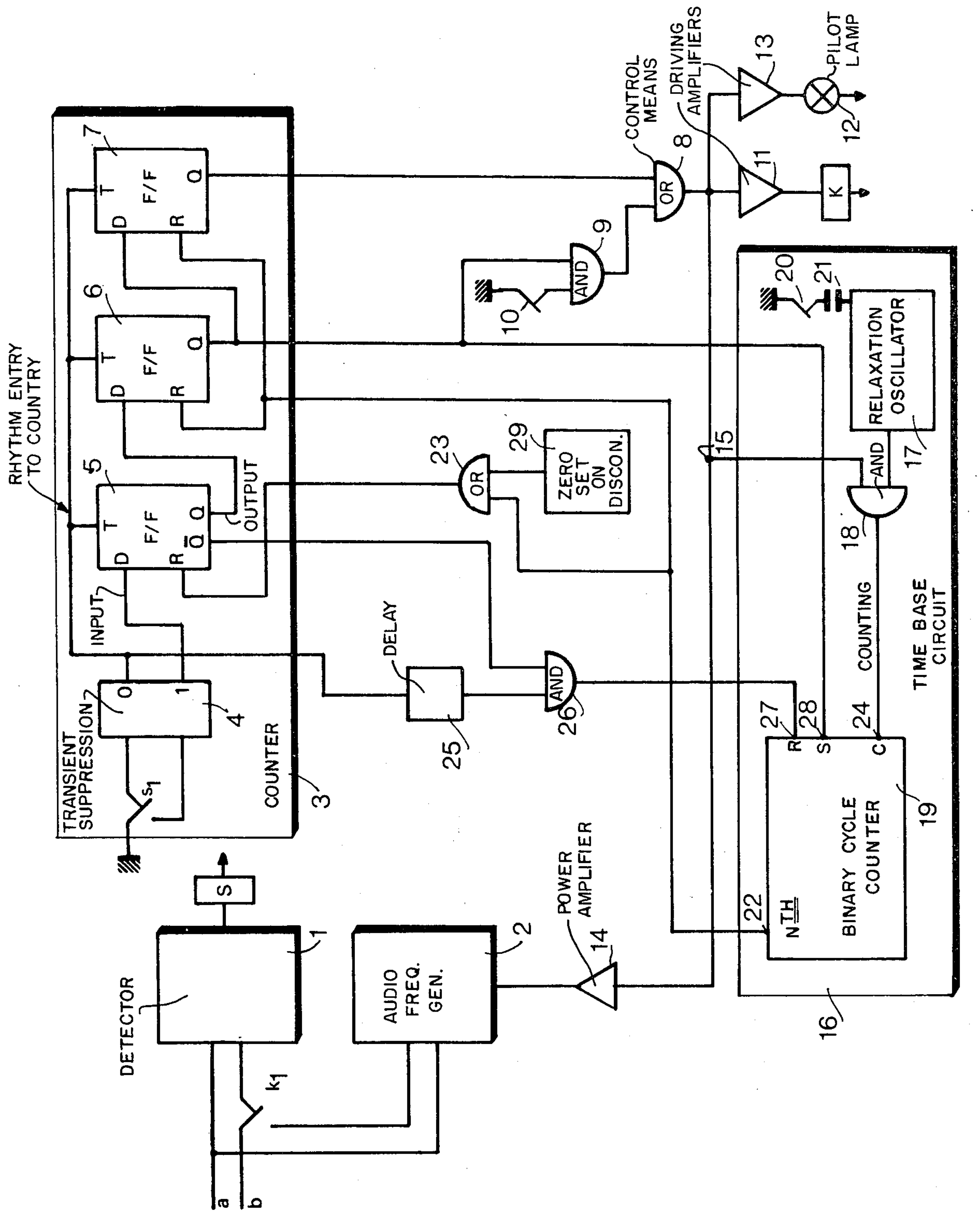
RHYTHM ENTRY TO COUNTRY
TRANSIENT SUPPRESSION
COUNTER
INPUT
OUTPUT
F/F
D
T
R
Q
$\bar{Q}$
DETECTOR
S
AUDIO FREQ. GEN.
POWER AMPLIFIER
DELAY
AND
OR
ZERO SET ON DISCON.
CONTROL MEANS
DRIVING AMPLIFIERS
PILOT LAMP
K
RELAXATION OSCILLATOR
COUNTING
TIME BASE CIRCUIT
BINARY CYCLE COUNTER
NTH
C
a
b
$k_1$
$s_1$

AUTOMATIC DEVICE FOR TESTING TELEPHONE EQUIPMENT

The present invention relates to an automatic answering device for testing telephone equipment.

Automatic answering devices for testing telephone equipment are utilised in telephone exchanges and networks to confirm the proper working conditions of the exchanges and networks which convey the telephonic messages. For example, in order to confirm the operation of a subscriber line, one may send the call number of the line from the exchange to which the line is connected. If the exchange and network are in working order, a signal at audio frequency is returned to the exchange, confirming that the subscriber telephone has received the call.

Answering devices also are utilized for the maintenance of the equipment of telephone exchanges, and in such use, they are associated with an automatic call sender. The ability of the exchange to handle a large number of simultaneous communications can also be checked.

Generally speaking, an automatic telephone answering device simulates the normal calling conditions which occur within a telephone exchange. In the first place, it detects ringing signals, then simulates the taking off the receiver of the hand set, and finally sends a signal at audio frequency to the calling exchange or number.

Up to now, this type of answering device has been completely electro-mechanical. The considerable dimensions of these answering devices prevent, for obvious reasons of space required, their use in sufficient numbers to enable, for example, the simulation of calls in the normal call rate density of a telephone exchange, or even of a substantial part of such density. In addition, it has been practically impossible to vary the time of operation of the various components of the electro-mechanical answering device to adapt it to the different types of exchanges and to the different types of tests.

There are also telephone answering devices capable of replying to calls by the use of vocal recordings on magnetic tape. Such devices usually have facility for recording, during a predetermined time, the information spoken by the caller. These answering devices are likewise cumbersome and also are expensive because they include tape recorder equipment.

Furthermore, the cycle time of operation is long and would be unacceptable simply for testing equipment.

An object of the present invention to provide an automatic answering device to test telephone equipment which obviates or mitigates the inconveniences mentioned above. In a preferred arrangement, the invention obviates the need for both electro-mechanical apparatus and tape recording equipment.

According to the present invention, there is provided an automatic answering device comprising detector means for detecting a telephone call, signal generating means for generating audio frequency signals and an electro-magnetic relay for connecting detector means to the telephone line or for connecting the telephone line to signal generating means. The answering device further includes counter means for counting whilst a call is incoming, a circuit capable of operating during a predetermined interval of time. At the end of the time interval, it brings the counter means back to its initial state. Control means operated by the counter means then operates the electro-magnetic relay to release the circuit.

According to another feature of the invention, the circuit comprises an oscillator and a cycle counter which counts the cycles in the output signal of the oscillator as applied to the counter means. When the count of the cycles has reached a predetermined number, the counter returns a zero signal and reverts to its initial state.

According to another feature, an AND gate is provided between the oscillator and the counting means. Inputs of the AND gate is connected to the output of the control means and the other to the output of the oscillator. The output of the AND gate is connected to the input of the cycle counter.

According to another feature, the counter means is a stage counter comprising several stages. The output of the first stage is connected to the reset or return to zero input of the cycle counter by an AND gate. The other input of this AND gate is connected to the rhythm entry of the counter stages. The outputs of the other stages are connected to the control means by a set of selection gates, thus permitting selection of an output by key means to choose a number of trains of ringing tonality which the counter means must count.

According to another feature, the detector means operates an electro-magnetic relay having a reversing contact which feeds a mono-stable flip flop, the output of the flip flop which corresponds to the working position of the contact is connected to an impulse input of the second stage of the train counter. The flip flop output corresponding to the rest position of the contact is connected to the rhythm inlet of each stage of the counter means.

An embodiment of the present invention will now be described by way of example, with reference to the accompanying drawing of which the single FIGURE shows diagrammatically an automatic answering device according to the invention.

The wires *a* and *b* of a telephone line are connected by the normally closed contact K1 of a relay K to the input of a detector means 1 capable of detecting the ringing of a telephone. The detector means may be of known type and may comprise, for example, a rectifier with bridge diodes and a filter. Rectified current from the detector means 1 feeds an electro-magnetic relay S having resting contacts $s_1$ which represent the condition when telephone ringing or the calling of the exchange does not appear on the lines *a*, *b*. On operation of the relays and contacts 51 indicate when such signals are applied to the lines *a*, *b*.

When the contact $K_1$ is in its operated position, the lines *a*, *b* are connected to the output of an audio frequency signal generator 2. The generator 2 may comprise in conventional manner a regulated oscillator which for example oscillates at a frequency of 850 Hz and feeds the primary of a transformer, the secondary of which is for connecting to the exchange station of through subscriber lines *a*, *b*.

The inverter contact $S_1$ forms part of a counter means 3 which comprises a transient suppression circuit 4 for suppressing transients from contact $S_1$ and a counter in three flip-flop stages mounted in displaced register. These flip-flops 5, 6 and 7 each have their rhythm entry T connected to the output 0 of the circuit 4. The first flip-flop 5 has its input terminal D connected to the output 1 of the circuit 4. The flip-flop 6 has its input D connected to the output Q of flip-flop 5 and the flip-flop 7 has its input D connected to the output Q of flip-flop 6.

The output Q of the flip-flop 7 is connected to an OR gate 8 constituting the control means. The outlet Q of the flip-flop 6 is connected to and AND gate 9 having two inputs, the second input of which is connected to the contact of a selection key switch 10. Although the counter means has been described as having three stages, it will be obvious that the number of stages is not limited. If more, if it is desired to be able to select at will the number of trains which the counter must count, it is necessary then to provide a set of AND gates such as 9 and a set of key switches such as 10, the OR gate 8 having likewise an increased number of inputs. One does not normally have an interest in choosing a high number of trains to count because the common numbers of the exchange are then uselessly occupied. Hence, in the preferred example of the invention the number of three stages has been selected.

The output of the OR gate 8 is, on the one hand, connected to an amplifier 11 which feeds the relay K and on the other hand to a pilot lamp 12 by a feed amplifier 13.

The output of the OR gate 8 furthermore is connected to the generator 2 by a power amplifier 14 and to an input 15 of a time base circuit 16.

The time base circuit 16 comprises a relaxation oscillator 17, an AND gate 18 and a binary counter 19. The oscillator 17 may be a reactioned triggered oscillator. The cycle of oscillator 17 may be modified by switching into circuit therewith a condensor 21 by means of switch 20. The cycle counter 19 comprises, for example, 16 binary counting stages. The output 22, of the last stage, is connected directly to the reset or return to zero inputs of the flip-flops 6 and 7 and, by means of an OR gate 23, to the reset or return to zero input of the flip-flop 5. The AND gate 18 has two inputs, one of which is connected at 15 to the output of gate 8 and the other of which is connected to the oscillator 17. The output of the AND gate 18 is connected to the counting input 24 of counter 19.

The output O of the circuit 4 is connected by means of a delay circuit 25 to an input of an AND gate 26 having two inputs, the second input of which is connected directly to the outlet Q of the flip-flop 5. The outlet of the AND gate 26 is connected to the reset or return to zero input 27 of the counter 19.

The binary counter 19 may be arranged to operate on a reducing count basis as opposed to an increasing count basis during its counting time. For this purpose, three display inputs are provided, but not shown. A set input 28 is connected to the output Q of the flip-flop 6.

A circuit 29 is provided to reset the flip-flop 5 to zero at the time of disconnecting of the answering device. The output of the circuit 29 is connected to the second input of the two input OR gate 23.

The operation of the answering device will now be described, assuming that the key swtich 10 and switch 20 are at rest. That is to say, the number of repeats of ringing to be counted is three. The duration of the signal sent by the generator 2 in reply to a call is about ten seconds.

Upon having a voltage applied thereto, the circuit 29 reset the flip-flop 5 via OR gate 23. In awaiting a call, the relays S and K are at rest positions.

On the commencement of the first ringing signal received over the lines *a, b,* the detector 1 feeds rectified ringing current to the relay S, which operates and reverses the position of a contact $s_1$. The outlet 1 of the circuit 4 is excited and applies a signal to the input D of the flip flop 5, the outputs of which do not change state. The output Q is therefore excited.

AT the end of the first train of ringing, the relay S falls back and the contact $s_1$ returns to rest. The output 0 of the circuit 4 is excited and applies a signal to the input T of each of the flip-flops 5, 6 and 7. Since only the input D of the flip-flop 5 has been previously energised, the outlets of only this flip-flop will change state. In fact, before it has changed state, the signal of the output 0 of circuit 4 has likewise passed through the delay circuit 25 and has been applied to the AND gate 26 which has therefore its two input terminals. The AND gate 26 inhibits the output 22 by applying a signal to the reset input 27 of the counter 19.

The flip-flop 5, having changed state, the outlet Q is excited and applies the signal to the inlet D of the flip-flop 6.

At the commencement of the second train of ringing, the relay S is again operated to reverse the contact $s_1$ excite the output 1 of circuit 4 once more. However, the flip-flops 5, 6 and 7 do not change state.

At the end of the second train of ringing, the relay S falls back and, as before, the outlet O of circuit 4 applies a signal to the inputs T. The flip-flop 6 changes state but not the flip-flop 7. The output Q of flip-flop 6 is excited and applies a signal to the input D of the flip-flop 7 to prepare for its change of state and to the charge inlet 28 of the counter 19, which is then set and ready for counting. A signal is likewise applied to the entry of the AND gate 9, but there is no influence on its output because the key switch 10 is at rest.

From the commencement of the third train of ringing, the relay S is again operated but the flip-flops 5, 6 and 7, do not change state.

At the end of the third train of ringing, the relay S falls back and the output O of circuit 4 applies a signal to the inputs T. The flip-flop 7 changes state. The signal of the output Q of flip-flop 7 excites, through the OR gate 8, the amplifier 11 which actuates relay K which in turn reverses its contact K; the amplifier 13 which illuminates the lamp 12, which in turn indicates that a call is received; the amplifier 14 which releases the operation of the generator 2; and the input 15 of the AND gate 18 which allows the signals coming from the oscillator 17 to pass to the counting input 24 of the binary cycle counter 19.

The generator 2 then emits a signal, at the frequency of 850 Hz, on the lines *a, b.* In addition, the counter 19 counts the cycles from oscilator 17 to a preset amount, representing about 10 seconds in time, after which the output 22 is excited.

The output 22 applies a reset or return to zero signals to the flip-flops 5, 6 and 7. After reset, the flip-flop 7 no longer applies a signal to the OR gate 8 and therefore causes the relay K to fall back. The contact $k_1$ returns to their rest position. In other respects, the oscillator 2 is not stopped, lamp 12 extinguishes, and the AND gate 18 turns off. The counter 19 remains at its last count with its output 22 excited until a first train of the next ringing is received, which will cause the inhibition of this output 22, as has been seen above.

In the case where it is desired that the answering should rely after having received only two trains of ringing current, the key switch 10 is opened which induces, at the end of the second train, the output Q of the flip-flop 6 to send a signal to the OR gate 8 through the energized AND gate 9. Then the conditions of operations described above will be repeated.

In opening the key switch 20, the cycle time of the output of the oscillator 17 is modified. Therefore, the counting time of the time base circuit 16 also changes. It is also possible to change this counting time by modifying the circuitry in conventional manner in counter 19.

As can be seen, the answering device according to the invention as described has extremely flexible conditions of use. To be noted is that the circuits of the device have been described utilizing a positive logircal expression. It will be very simple for one versed in the art to transform the device into negative logic. Except for the circuits 1 and 2 which may be constructed utilizing modest components, all the other circuits may be conceived as integrated semi-conductor circuits. Furthermore, the assembly of the device may be mounted on a printed circuit card having an approximate size of 130 × 111.5 mm with a thickness of 40 mm which gives an indication of the small amount of space taken up by a particular embodiment of the device of the invention.

Although the principles of the present invention have been described above in relation to one particular embodiment, it must be understood that the description has been given by way of example and does not limit the scope of the invention.

What we claim is:

1. An automatic telephone line test device comprising detector means for detecting intervals of telephone ringing current appearing on said line, generating means for generating signals at audio frequency, first relay means connected to have one position to connect the detector means to a telephone line and another position to connect the generator means to said telephone line, multi-stage ringing interval counter means for counting a predetermined number of ringing current intervals as they are received over said line and detected by the detector means, timing circuit means operating during a predetermined interval of time and resetting said ringing interval counter means to an initial state at the end of said time interval, control means actuated by an output of said ringing interval counter means to switch said electromagnetic relay to said other position to trigger the operation of the said timing circuit means.

2. An automatic device according to claim 1 and cycle counting means, said timing circuit comprising an oscillator and said cycle counter for counting the cycles from the output of the said oscillator which are applied to the counter, and means for delivering, when the count of the said cycles has reached a predetermined number, a return of the counter to a zero setting for bringing back the said counter means to its initial state.

3. An automatic device according to claim 2, including an AND gate connected between the said oscillator and the said cycle counter, said AND gate having two inputs one of which is connected to the output of the said control means and the other to the output of the said oscillator, the AND gate output being connected to a counting inlet of the said cycle counter.

4. An automatic device according to claim 3, wherein the said ringing interval counter means has a return to zero terminal, the output of the first stage being connected via one input of a two input AND gate to the input of the return to zero input of the said cycle counter, the other input of said last named AND gate being connected to a terminal for receiving cyclic pulses for the rhythm entry of the counter means, the outputs of the other counter stages being connected to the said control means via a set of correction gates for selecting an outlet by means of a key switch for choosing the number of ringing repeats which said counter means must count before the generating means is connected to the telephone line.

5. An automatic device according to claim 4, and means responsive to said detector means for activating an electro-magnetic relay having a reversing contact which drives a flip flop, the output of which corresponds to the working positions of the relay contact, means for connecting said flip flop to an impulse input of the first stage of the said counter means whilst the output corresponding to the rest position of the contact is connected to the rhythm input of each stage of the counter means.

6. The device of claim 1 and means for operating said ringing interval counter means to advance it one count responsive to each of a plurality of ringing intervals, and means responsive to said ringing interval counter reaching a preselected count for actuating said control means.

7. An automatic telephone test device comprising detector means for detecting telephone ringing signals, generating means for generating signals at audio frequency, first relay means having one position for connecting the detector means to a telephone line and another position for connecting the generator means to said telephone lines, multi-stage ringing interval counter means for counting a preselected number of ringing intervals as detected by said detector means, timing circuit means operating during a predetermined time interval and for thereafter resetting said ringing interval counter means to the initial state at the end of said time interval, control means actuated by an output of said ringing interval counter means to switch said first relay means into said other position and to trigger the operation of said timing circuit means, second relay means having a reversing contact, flip-flop means having outputs which corresponds to the operate and release positions of the second relay means, means responsive to said detector means for causing said second relay means to drive said flip-flop, and means for connecting said flip-flop to an input of a first stage of said ringing interval counter means while an output corresponding to rest positions of said second relay means is connected to a rhythm input of each stage of said ringing interval counter means.

8. An automatic device according to claim 7, wherein said timing circuit means comprises an oscillator having an output, cycle counter means connected to said oscillator, a first two input AND gate having one input connected to the output of said oscillator and the other input connected to the output of said control means, the output of said AND gate being connected to a counting inlet of said cycle counter which counts the successive cycles from the said oscillator, means responsive to the count of the said cycle counter reaching a predetermined number for giving a reset signal to said ring counter means, second two input AND gate, means for connecting an output of the first stage of said counter means to one input of said second two input AND gate, the other input of the said second AND gate being connected to the rhythm input of said ringing interval counter means, means for counting the output of said second AND circuit to a reset input of the said cycle counter, key switch means, and means for connecting the outputs of the other ring counter stages to said control means via a set of selection gates for selecting an outlet by means of said key switch, whereby said answering device selects a number of ringing intervals which said ring counter means must count before said generating means is connected to the telephone line.

* * * * *

UNITED STATES PATENT OFFICE

CERTIFICATE OF CORRECTION

Patent No. 3,875,343 Dated April 1, 1975

Inventor(s) Joseph Quere

It is certified that error appears in the above-identified patent and that said Letters Patent are hereby corrected as shown below:

Column 4, line 17, after "terminals" insert -- excited --.

Signed and Sealed this

*second* Day of *December 1975*

[SEAL]

*Attest:*

RUTH C. MASON
*Attesting Officer*

C. MARSHALL DANN
*Commissioner of Patents and Trademarks*